US012327131B2

(12) United States Patent
Niu et al.

(10) Patent No.: US 12,327,131 B2
(45) Date of Patent: Jun. 10, 2025

(54) VIRTUAL ACCELERATORS IN A VIRTUALIZED COMPUTING SYSTEM

(71) Applicant: VMware LLC, Palo Alto, CA (US)

(72) Inventors: Bing Niu, Beijing (CN); Jin He, Beijing (CN); Qi Liu, Beijing (CN); Sheng Fang, Beijing (CN); Xiangdong Che, Beijing (CN); Xiangjun Song, Beijing (CN)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 18/609,649

(22) Filed: Mar. 19, 2024

(65) Prior Publication Data

US 2024/0220310 A1    Jul. 4, 2024

Related U.S. Application Data

(63) Continuation of application No. 17/464,083, filed on Sep. 1, 2021, now Pat. No. 11,960,919.

(30) Foreign Application Priority Data

Jul. 19, 2021    (WO) ................ PCT/CN2021/107116

(51) Int. Cl.
*G06F 9/455* (2018.01)
*G06F 9/445* (2018.01)
*G06F 12/1045* (2016.01)
*G06F 13/40* (2006.01)

(52) U.S. Cl.
CPC ...... *G06F 9/45558* (2013.01); *G06F 9/44505* (2013.01); *G06F 12/1045* (2013.01); *G06F 13/4022* (2013.01); *G06F 2009/45583* (2013.01)

(58) Field of Classification Search
CPC .... G06F 3/0662; G06F 9/455; G06F 9/45504; G06F 9/45533; G06F 9/45537; G06F 9/46; G06F 9/4806
See application file for complete search history.

(56) References Cited

U.S. PATENT DOCUMENTS 11,182,190 B2    11/2021    Gong
11,301,407 B2 *   4/2022    Sen ...................... G06F 3/0619
2023/0041806 A1   2/2023    Singh

* cited by examiner

*Primary Examiner* — Andy Ho
(74) *Attorney, Agent, or Firm* — Kim & Stewart LLP

(57) ABSTRACT

An example method of offloading a compute task to an accelerator by an application executing in a host cluster includes: sending, by an application executing in an initiator host, the compute task to a virtual accelerator in the initiator host, the virtual accelerator paired with a hardware accelerator in a target host of the host cluster; forwarding, by the virtual accelerator, the compute task to the hardware accelerator in the target host over a network; and receiving, at the application via the virtual accelerator, a result of the compute task from the hardware accelerator over the network.

17 Claims, 4 Drawing Sheets

VIRTUAL ACCELERATORS IN A VIRTUALIZED COMPUTING SYSTEM

CROSS-REFERENCE

This application is a continuation of U.S. patent application Ser. No. 17/464,083, filed Sep. 1, 2021, which is based upon and claims the benefit of priority from International Patent Application No. PCT/CN2021/107116, filed Jul. 19, 2021. Each of the aforementioned patent applications are incorporated by reference herein.

BACKGROUND

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

Some hosts in a host cluster may have hardware accelerators in their hardware platforms. Applications can use hardware accelerators to offload computation tasks for computation using hardware circuitry (e.g., a neural network configured in a field programmable gate array (FPGA)), rather than performing the computing in software. Applications in hosts without hardware accelerators may have computation tasks that could benefit from hardware acceleration. Thus, it is desirable to virtualize hardware accelerators in a host cluster so that applications executing in hosts without hardware accelerators can nevertheless make use of hardware acceleration.

SUMMARY

In embodiments, a method of virtualizing a hardware accelerator in a host cluster of a virtualized computing system includes: commanding, at an initiator host in the host cluster, a programmable expansion bus device to reconfigure as a virtual accelerator based on specifications of a hardware accelerator in a target host of the host cluster; executing, in the programmable expansion bus device, software to emulate the virtual accelerator as connected to an expansion bus of the initiator host; receiving, at the programmable expansion bus device, compute tasks from an application executing in the initiator host; and sending, to the target host, the compute tasks for processing by the hardware accelerator.

Further embodiments include a non-transitory computer-readable storage medium comprising instructions that cause a computer system to carry out the above methods, as well as a computer system configured to carry out the above methods.

DETAILED DESCRIPTION

Virtual accelerators in a virtualized computing system are described. The techniques described herein improve the utilization and management simplicity of physical accelerators by managing and scheduling the resource globally with the help of software and a programmable expansion bus device having high speed networking channel, to deliver the computation acceleration capability to other computer hosts or virtual machines which have no acceleration device locally attached. In embodiments, the programmable expansion bus device comprises a smart network interface card (NIC). The expansion bus device re-targeting technique described herein presents a solution to dis-aggregate or de-couple the computation accelerator from the host computer and virtual machine. The binary execution translation application technique described herein masks the differences among multiple heterogeneous physical accelerators in the computing infrastructure and simplifies the system management and operations. These and further embodiments are described below with respect to the drawings.

Figure 1:
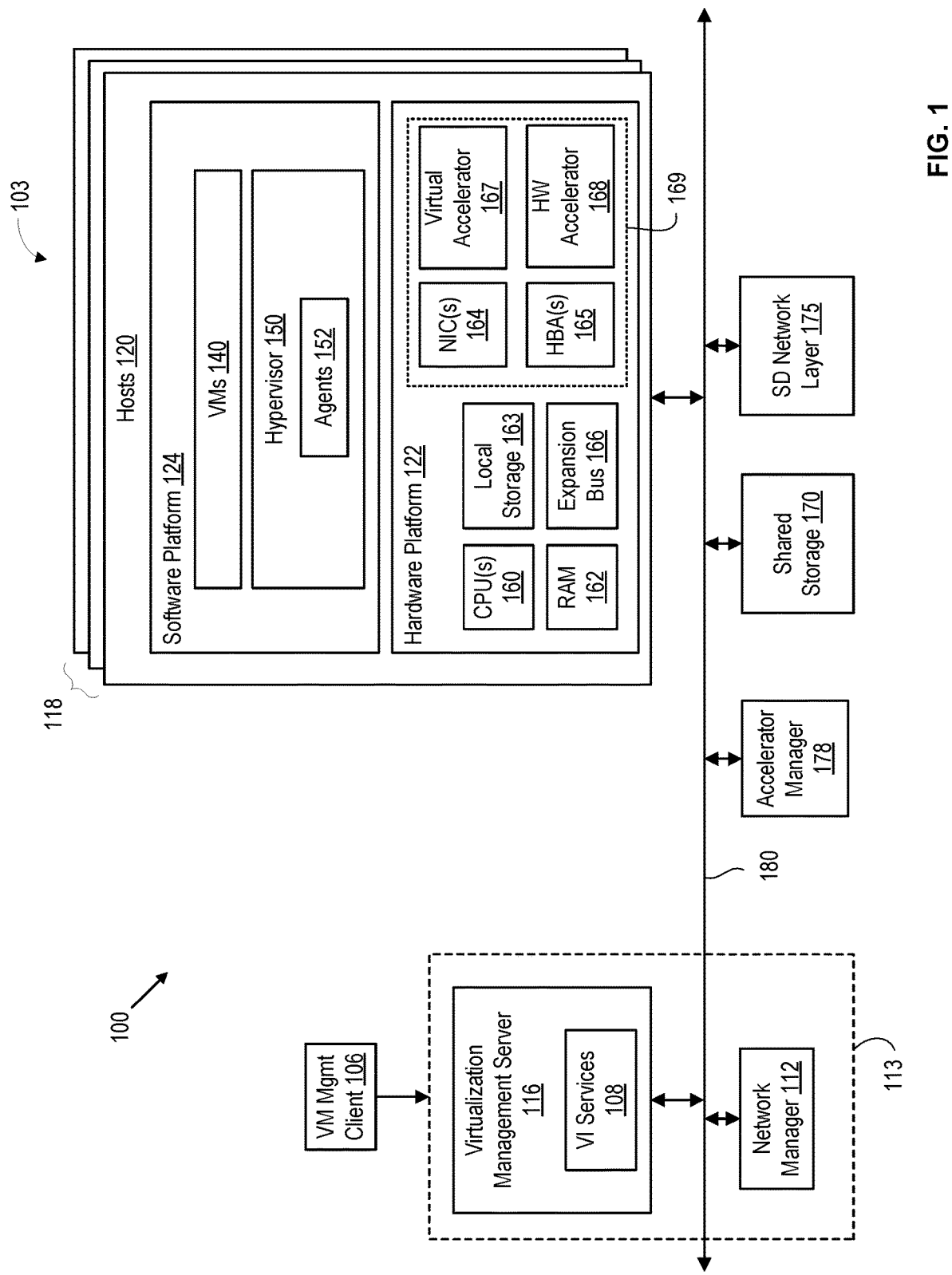
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, one or more host bust adaptors (HBAs) 165, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 can access shared storage 170 by using NICs 164 to connect to network 180. In addition or alternatively, hosts 120 can access shared storage 170 using HBAs 165 connected to a separate network 181 (e.g., a fibre channel (FC) network). Shared storage 170 include one or more storage arrays, such as a storage area network (SAN), network attached storage (NAS), or the like. Shared storage 170 may comprise magnetic disks, solid-state disks (SSDs), flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (vSAN), which is another form of shared storage 170.

In embodiments, hardware platform 122 includes an expansion bus 166, such as a peripheral component interconnect express (PCIe) expansion bus or the like. Various expansion bus devices 169 can be connected to expansion bus 166 (e.g., PCIe devices), including NIC(s) 164 and HBA(s) 165. In embodiments, one or more of hosts 120 include a hardware accelerator 168 connected to the expansion bus 166. A hardware accelerator 168 can include a programmable device, such as an FPGA or the like, and configured to perform computation tasks in hardware. Those hosts 120 that do not include a hardware accelerator 168 can instead be configured with a virtual accelerator 167. In embodiments described below, one or more of NICs 164 can be a "smart NIC," which is a NIC having processing hardware (e.g., CPU, memory, FPGA, etc.) that can execute software/firmware. Such a smart NIC can be reconfigured and repurposed to become a virtual accelerator 167. Each virtual accelerator 167 presents an interface of a hardware accelerator to applications executing in the host. However, a virtual accelerator 167 pairs with a hardware accelerator 168 in host cluster and sends computational tasks to the host having the paired hardware accelerator.

In embodiments, an accelerator manager 178 manages virtual acceleration in host cluster 120. Accelerator manager 178 can be a service in virtualization management server 116, can execute in another dedicated host, or within a host 120 of host cluster 120 (e.g., within a VM 140). Accelerator manager 178 can cooperate with an accelerator agent in each host (e.g., one of agents 152) to cause a smart NIC therein to be repurposed as a virtual accelerator 167. Accelerator manager 178 can perform other functions, such as scheduling (e.g., when there are multiple target hardware accelerators that can be matched with a virtual accelerator).

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host cluster 118 (collectively hypervisors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available by VMware, Inc. of Palo Alto, CA. An embodiment of software platform 124 is discussed further below with respect to FIG. 2.

In embodiments, host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure.

Virtualization management server 116 is a physical or virtual server that manages host cluster 118 and the virtualization layer therein. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA. If network manager 112 is absent, virtualization management server 116 can orchestrate SD network layer 175.

Virtualization management server 116 and network manager 112 comprise a virtual infrastructure (VI) control plane 113 of virtualized computing system 100. In embodiments, network manager 112 is omitted and virtualization management server 116 handles virtual networking. Virtualization management server 116 can include VI services 108. VI services 108 include various virtualization management services, such as a distributed resource scheduler (DRS), high-availability (HA) service, single sign-on (SSO) service, virtualization management daemon, vSAN service, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like.

Figure 2:
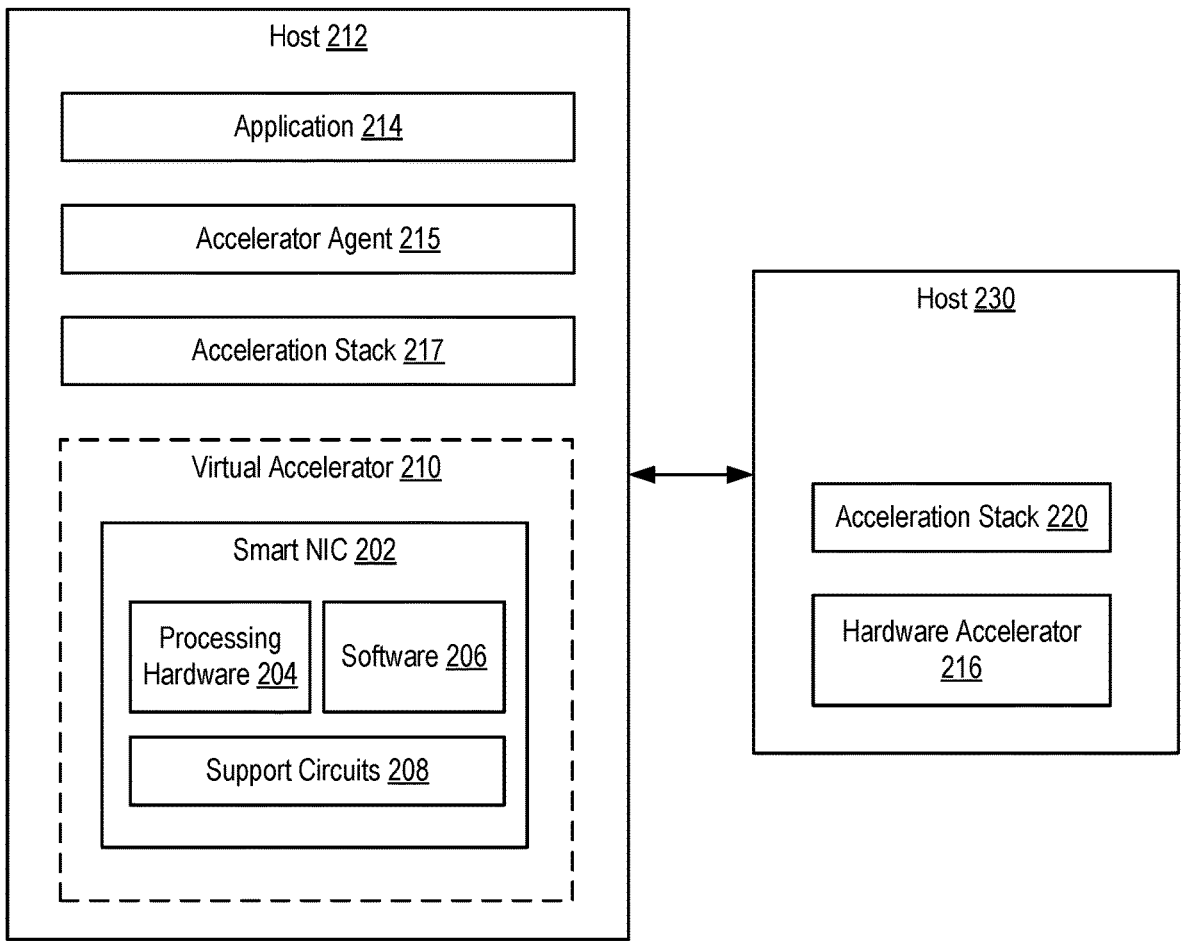
FIG. 2 is a block diagram depicting virtual acceleration according to embodiments.

FIG. 2 is a block diagram depicting virtual acceleration according to embodiments. A host 212 is in communication with a host 230 via a network (e.g., examples of hosts 120 in FIG. 1). Host 230 includes a hardware accelerator 216 along with an acceleration stack 220. Host 212 includes an application 214 executing therein, along with an accelerator agent 215 and an acceleration stack 217. Host 212 also includes a smart NIC 202. Smart NIC 202 includes processing hardware 204, software 206, and support circuits 208. Processing hardware 204 can include a CPU, programmable device (e.g., FPGA), or a combination thereof. Processing hardware 204 also includes memory for storing software 206 (or firmware). Support circuits 208 include various circuits to support processing hardware, such as interface circuits.

Accelerator agent 215 can be in communication with accelerator manager 178 and is configured to communicate with smart NIC 202 for re-purposing smart NIC 202 to virtual accelerator 210. Accelerator agent 215 in an initiator host sends a request to accelerator manager 178 to allocate and claim a hardware accelerator. Accelerator manager 178 locates and reserves one or more hardware accelerators in target host(s). Accelerator manager 178 responds to accelerator agent 215 in the initiator host identifying the hardware accelerator(s) in the target host(s). Accelerator agent 215 can then notify smart NIC 202 of the address(es) of the target host(s). Software 206 in smart NIC 202 can include a manager process that accepts and executes instructions from accelerator agent 215. Smart NIC 202 is programmable in that software 206 can control interactions among itself, the host, and peer smart NIC devices connected to the network and schedules computation, memory, and communication resources. In addition, smart NIC 202 can be re-targeted or re-purposed as other types of expansion bus devices (e.g., to present as a graphic card or other type of hardware accelerator device). Acceleration stack 217 includes one or more layers of software that provide an interface between application 214 and virtual accelerator 210.

Virtual accelerator 210 is paired with hardware accelerator 216 and is configured to send compute tasks to host 230. The compute tasks are received by acceleration stack 220, which provides an interface to hardware accelerator 216. Acceleration stack 220 provides the compute tasks to hardware accelerator 216, which performs the processing. Hardware accelerator 216 returns the results to acceleration stack 220, which in turn returns the results to smart NIC 202. Smart NIC 202 forwards the results back to application 214 through acceleration stack 217.

Figure 3:
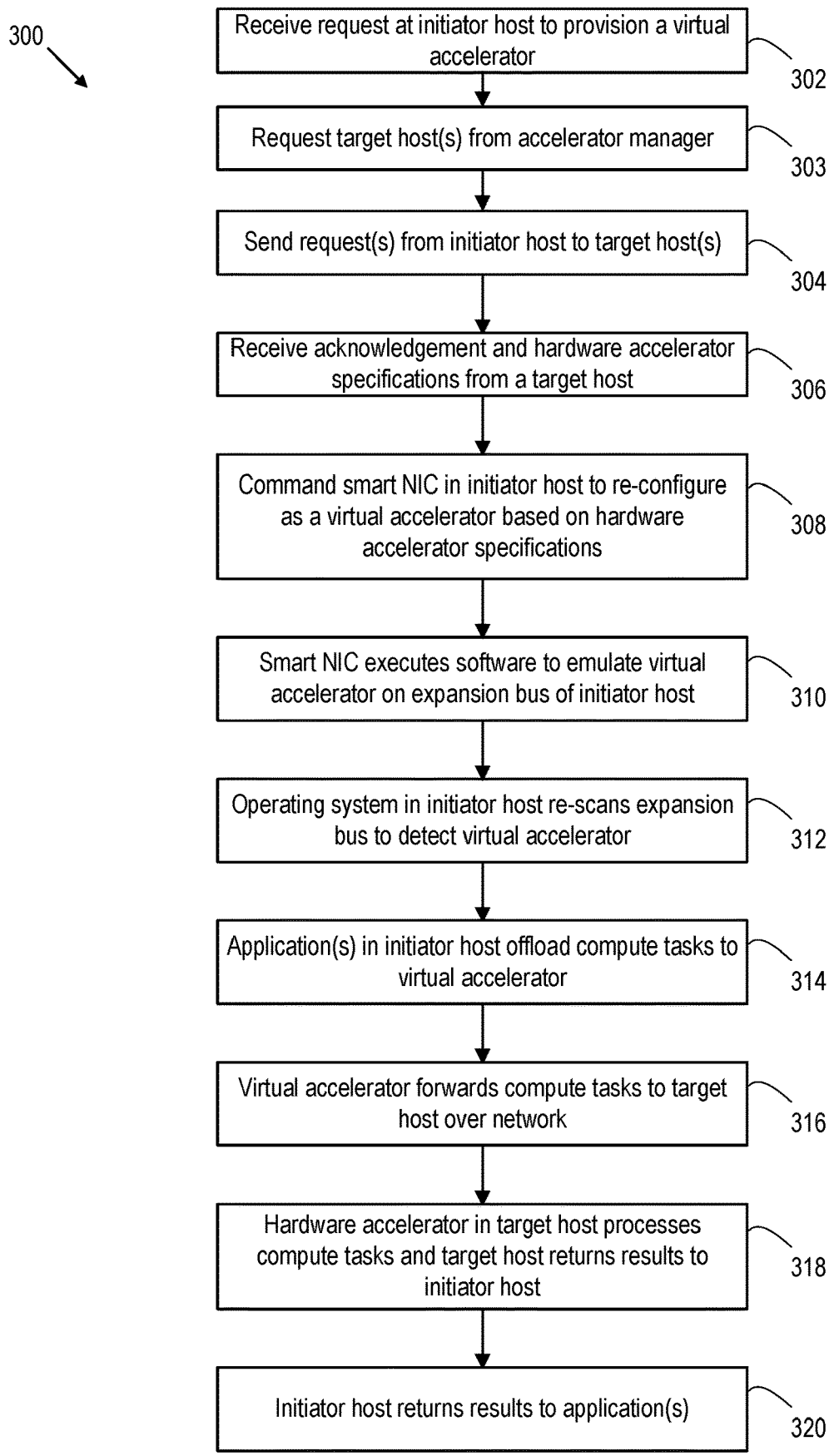
FIG. 3 is a flow diagram depicting a method of virtual acceleration according to embodiments.

FIG. 3 is a flow diagram depicting a method 300 of virtual acceleration according to embodiments. Method 300 begins at step 302, where accelerator agent 215 in an initiator host (e.g., host 212) receives a request to provision a virtual accelerator. The request can identify one or more target hosts having hardware accelerators. Alternatively, at step 303, accelerator agent 215 communicates with accelerator manager 178 to identify target host(s). Accelerator manager 178 determines which target host(s) are to be used for the compute tasks and returns identification information to accelerator agent 215. At step 304, initiator host (e.g., accelerator agent 215) sends request(s) to target host(s) per the request. At step 306, initiator host receives acknowledgement and hardware accelerator specifications from a target host. At step 308, initiator host (e.g., accelerator agent 215) commands smart NIC 202 to reconfigure as virtual accelerator 210 based on the hardware accelerator specifications. That is, smart NIC 202 re-targets itself to present as hardware accelerator 216 on the expansion bus of the initiator host, with the same or similar functionality and capability. At step 310, smart NIC 202 executes software 206 to emulate virtual accelerator 210 on the expansion bus of the initiator host.

At step 312, an operating system in initiator host (e.g., a guest operating system in a VM) re-scans the expansion bus to detect virtual accelerator 210. At step 314, application(s) in initiator host (e.g., application 214) offload compute tasks to virtual accelerator 210 (e.g., through acceleration stack 217). At step 316, virtual accelerator 210 forwards the compute tasks to the target host over the network. At step 318, hardware accelerator 216 in the target host processes the compute tasks and returns the results to the initiator host (e.g., through acceleration stack 220). At step 320, the initiator host returns the results to the application(s) (e.g., through acceleration stack 217).

Returning to FIG. 2, application 214 is managed by an operating system. In an embodiment, application 214 is managed by an operating system in a VM. However, application 214 can be managed by an operating system executing directly on the hardware platform of host 212. Acceleration stack 217 can execute along with application 214 on the operating system (e.g., either in a VM or directly on the hardware of host 212). Accelerator agent 215 can execute in a hypervisor or operating system executing on the hardware of host 212. Acceleration stack 220 can be managed by an operating system that executes in a VM or directly on host 230.

Returning to FIG. 3, at step 314, the applications offload compute tasks to virtual accelerator 210. In embodiments, the applications can offload binary code generated by an OpenCL compiler or the like running in the initiator host (e.g., in a VM with the applications). In embodiments, at step 316, software 206 is configured to perform translation of the binary code received from the applications into a format executable by hardware accelerator 216 in the target host. For example, software 206 can translate OpenCL code to another standards (e.g., CUDA). In embodiments, applications can offload the compilation of code to virtual accelerator 210. Software 206 in smart NIC 202 can then compile the code to generate binary code for programming hardware accelerator 216.

Figure 4:
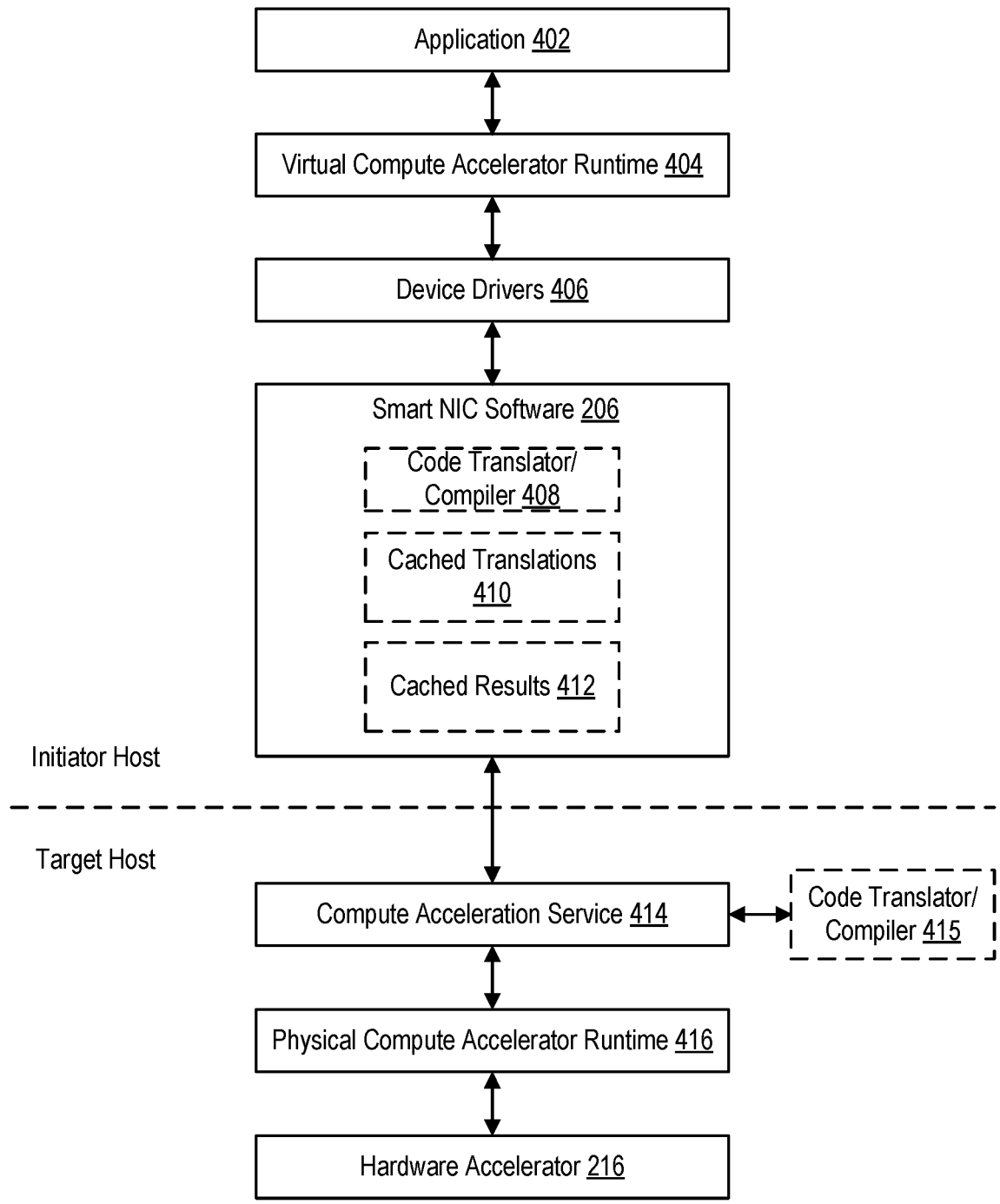
FIG. 4 is a block diagram depicting communication between an application and a remote hardware accelerator according to embodiments.

FIG. 4 is a block diagram depicting communication between an application and a remote hardware accelerator according to embodiments. An application 402 executes in an initiator host. Application 402 sends compute tasks to virtual compute accelerator runtime 404. The compute tasks can be formatted according to a standard, such as OpenCL. Virtual compute accelerator runtime 404 forwards the compute tasks to smart NIC software 206 through device drivers 406. Smart NIC software 206 executes the smart NIC that has been re-targeted to present as a virtual accelerator. In embodiments, smart NIC software 206 forwards the compute tasks as received from application 402 to compute acceleration service 414 in the target host. In other embodiments, smart NIC software 206 translates the compute tasks from one standard to another (e.g., from OpenCL to CUDA) using a code translator/compiler 408. In some embodiments, smart NIC software 206 compiles code from the application to generate binary code using code translator/compiler 408. In some embodiments, smart NIC software 206 can store cached translations 410 identifiable using fingerprints (e.g., hashes) of the received compute tasks. In some embodiments, smart NIC software 206 can store cached results 412 of previous computation tasks returned by hardware accelerator. Smart NIC software 206 can generate a signature of the compute task (e.g., function, parameters, etc.) and determine that one or more compute tasks have been previously performed and results stored in cached results 412.

Compute acceleration service 414 in target host receives the compute tasks from smart NIC software 206. In some embodiments, if the compute tasks require translation from one standard to another, smart NIC software 206 can defer translation to the target host rather than perform the translation. In such case, compute acceleration service 414 can invoke code translator/compiler 415 executing in target host to perform a code translation (e.g., OpenCL to CUDA). In some embodiments, if code requires compilation, smart NIC software 206 can defer the compilation to the target host rather than perform the compilation itself. IN such case, compute acceleration service 414 can invoke code translator/compiler 415 executing in target host to perform the code compilation. Compute acceleration service 414 provides the compute tasks to physical compute accelerator runtime 416, which in turn provides the tasks to hardware accelerator 216. Hardware accelerator 216 preforms the compute tasks and returns the results to physical compute accelerator runtime 416. Physical compute accelerator runtime 416 returns the results to compute acceleration service 414, which sends the results to smart NIC software 206. Smart NIC software 206 can store the results in cached results 412 in some embodiments as discussed above. Smart NIC software 206 returns the results to application 402 through device drivers 406 and virtual compute accelerator runtime 404.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of offloading a compute task to an accelerator by an application executing in a host cluster, the method comprising:

sending, by an application executing in an initiator host, the compute task to a virtual accelerator in the initiator host, the virtual accelerator paired with a hardware accelerator in a target host of the host cluster, the virtual accelerator comprising a programmable expansion bus device in the initiator host that is reconfigured as the virtual accelerator based on specifications of the hardware accelerator in the target host;

forwarding, by the virtual accelerator, the compute task to the hardware accelerator in the target host over a network; and receiving, at the application via the virtual accelerator, a result of the compute task from the hardware accelerator over the network.

2. The method of claim 1, wherein the programmable expansion bus device comprises a network interface card (NIC) having processing hardware and software executing on the processing hardware.

3. The method of claim 1, wherein the application sends the compute task by sending binary code to the virtual accelerator, the method further comprising:

translating, by the virtual accelerator, the binary code from a first format to a second format, where binary code in the second format is executable by the hardware accelerator.

4. The method of claim 3, further comprising:

storing, by the virtual accelerator, the binary code having the second format in a cache on the virtual accelerator.

5. The method of claim 1, further comprising:

compiling, by the virtual accelerator, the compute task to generate binary code in a format that is executable by the hardware accelerator.

6. The method of claim 1, further comprising:

storing, by the virtual accelerator, the result in a cache on the virtual accelerator.

7. A non-transitory computer readable medium comprising instructions to be executed in a computing device to cause the computing device to carry out a method of a method of offloading a compute task to an accelerator by an application executing in a host cluster, the method comprising:

sending, by an application executing in an initiator host, the compute task to a virtual accelerator in the initiator host, the virtual accelerator paired with a hardware accelerator in a target host of the host cluster, the virtual accelerator comprising a programmable expansion bus device in the initiator host that is reconfigured as the virtual accelerator based on specifications of the hardware accelerator in the target host;

forwarding, by the virtual accelerator, the compute task to the hardware accelerator in the target host over a network; and receiving, at the application via the virtual accelerator, a result of the compute task from the hardware accelerator over the network.

8. The non-transitory computer readable medium of claim 7, wherein the programmable expansion bus device comprises a network interface card (NIC) having processing hardware and software executing on the processing hardware.

9. The non-transitory computer readable medium of claim 7, wherein the application sends the compute task by sending binary code to the virtual accelerator, the method further comprising:

translating, by the virtual accelerator, the binary code from a first format to a second format, where binary code in the second format is executable by the hardware accelerator.

10. The non-transitory computer readable medium of claim 9, further comprising:

storing, by the virtual accelerator, the binary code having the second format in a cache on the virtual accelerator.

11. The non-transitory computer readable medium of claim 7, further comprising:

compiling, by the virtual accelerator, the compute task to generate binary code in a format that is executable by the hardware accelerator.

12. The non-transitory computer readable medium of claim 7, further comprising:

storing, by the virtual accelerator, the result in a cache on the virtual accelerator.

13. A host computer, comprising:

a hardware platform configured to execute an application having a compute task; and a virtual accelerator in the hardware platform, the virtual accelerator paired with a hardware accelerator in a target host connected to the host computer by a network, the virtual accelerator comprises a programmable expansion bus device in the host computer that is reconfigured as the virtual accelerator based on specifications of the hardware accelerator in the target host;

wherein the application is operable to send the compute task to the virtual accelerator and receive a result of the compute task from the virtual accelerator; and wherein the virtual accelerator is operable to forward the compute task to the hardware accelerator in the target host over the network and receive the result of the compute task from the hardware accelerator over the network.

14. The host computer of claim 13, wherein the programmable expansion bus device comprises a network interface card (NIC) having processing hardware and software executing on the processing hardware.

15. The host computer of claim 13, wherein the application is operable to send the compute task by sending binary code to the virtual accelerator, and wherein the virtual accelerator is operable to translate the binary code from a first format to a second format, where binary code in the second format is executable by the hardware accelerator.

16. The host computer of claim 13, wherein the virtual accelerator is operable to compile the compute task to generate binary code in a format that is executable by the hardware accelerator.

17. The host computer of claim 13, wherein the virtual accelerator is operable to store the result in a cache on the virtual accelerator.

* * * * *